US012522362B2

(12) United States Patent
Adcock et al.

(10) Patent No.: US 12,522,362 B2
(45) Date of Patent: Jan. 13, 2026

(54) HYBRID BOTTOM SEAT CUSHION

(71) Applicant: B/E Aerospace, Inc., Winston-Salem, NC (US)

(72) Inventors: Christopher D. Adcock, Advance, NC (US); Ryan J. Suhre, Winston-Salem, NC (US); Stephen A. Puglisi, Greensboro, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 205 days.

(21) Appl. No.: 18/236,606

(22) Filed: Aug. 22, 2023

(65) Prior Publication Data

US 2023/0391456 A1  Dec. 7, 2023

Related U.S. Application Data

(63) Continuation-in-part of application No. 17/697,262, filed on Mar. 17, 2022, now Pat. No. 11,827,363.

(51) Int. Cl.
| | | |
|---|---|---|
| *B60N 2/68* | (2006.01) | |
| *B60N 2/64* | (2006.01) | |
| *B64D 11/06* | (2006.01) | |

(52) U.S. Cl.
CPC .......... *B64D 11/0647* (2014.12); *B60N 2/646* (2013.01)

(58) Field of Classification Search
CPC ............................ B64D 11/0647; B60N 2/646
See application file for complete search history.

(56) References Cited

U.S. PATENT DOCUMENTS

| | | | |
|---|---|---|---|
| 3,642,323 A * | 2/1972 | Taylor | A47C 5/125 |
| | | | 297/452.17 |
| 5,439,270 A | 8/1995 | Owen | |
| 5,485,976 A | 1/1996 | Creed et al. | |
| 5,632,053 A | 5/1997 | Weingartner et al. | |
| 6,089,657 A * | 7/2000 | Banno | A47C 7/029 |
| | | | 297/218.1 |
| 6,695,406 B2 | 2/2004 | Plant | |
| 6,739,671 B2 | 5/2004 | Maina | |
| 8,272,694 B2 | 9/2012 | Hawkins et al. | |

(Continued)

FOREIGN PATENT DOCUMENTS

| | | |
|---|---|---|
| EP | 1752573 A2 | 7/2010 |
| EP | 2828156 B1 | 5/2018 |

(Continued)

OTHER PUBLICATIONS

Extended European Search Report dated Jul. 13, 2023; European Application No. 231621780.

(Continued)

*Primary Examiner* — Timothy J Brindley
(74) *Attorney, Agent, or Firm* — Suiter Swantz IP (57) ABSTRACT

An aircraft cushion includes a lower portion, upper portion, and forward portion of foam. The lower portion is configured to be located by a forward frame element (e.g., tube) and to be supported by the forward frame element and a seat diaphragm (e.g., stretched fabric). The upper portion and forward portion are softer for user comfort. The lower portion, using a shape of the foam (e.g., structural foam), may removably snap onto the forward frame element, and rotate down into place for ease of installation.

18 Claims, 10 Drawing Sheets

(56) References Cited

U.S. PATENT DOCUMENTS

| | | | |
|---|---|---|---|
| 8,550,564 | B1 | 10/2013 | Kismarton et al. |
| 8,782,835 | B2 | 7/2014 | Pozzi |
| 9,580,175 | B2 | 2/2017 | Velasco et al. |
| 10,144,515 | B2 | 12/2018 | Le et al. |
| 10,518,886 | B2 | 12/2019 | Velasco |
| 10,543,764 | B2 * | 1/2020 | Oshima .................. B60N 2/64 |
| 10,661,905 | B2 | 5/2020 | Schumm |
| 10,669,030 | B1 | 6/2020 | Morse et al. |
| 10,766,622 | B2 | 9/2020 | Abelheira et al. |
| 11,089,880 | B1 | 8/2021 | Suhre et al. |
| 11,203,434 | B2 | 12/2021 | D'Alessio et al. |
| 2003/0094838 | A1 | 5/2003 | Williamson |
| 2011/0101165 | A1 | 5/2011 | Fullerton et al. |
| 2013/0127227 | A1 | 5/2013 | Oleson |
| 2015/0239566 | A1 | 8/2015 | Laib et al. |
| 2020/0130847 | A1 | 4/2020 | Segura et al. |
| 2021/0353476 | A1 | 11/2021 | Lafleche et al. |

FOREIGN PATENT DOCUMENTS

| | | | |
|---|---|---|---|
| EP | 3981643 | A1 | 4/2022 |
| WO | 2022000044 | A1 | 1/2022 |

OTHER PUBLICATIONS

Keder Solutions, URL: https://www.kedersolutions.com/products/, Downloaded Jan. 20, 2022, 4 pages.

European Patent Office, Examination Report received in EP Application No. 23162178.0, Feb. 18, 2025, 7 pages.

European Search Report received in EP Application No. 24195979.0, Oct. 15, 2024, 8 pages.

* cited by examiner

HYBRID BOTTOM SEAT CUSHION

CROSS-REFERENCE TO RELATED APPLICATIONS

The present application claims the benefit under 35 U.S.C. § 120 of U.S. patent application Ser. No. 17/697,262, filed on Mar. 17, 2022 and entitled COMPOSITE SEAT BOTTOM DIAPHRAGM. Said U.S. application Ser. No. 17/697,262 is hereby incorporated by reference in its entirety.

BACKGROUND

Aircraft seats often employ a fabric-based diaphragm to support a seat cushion and passenger. Such diaphragms are difficult to install because they require stretching during installation, and they wear out rapidly.

Current economy class aircraft seat cushions may sit on some type of bottom diaphragm, many are attached with velcro. One issue with this attachment method is a possible lack of location accuracy and, if mislocated, can affect passenger comfort along with wearing out the cushion prematurely.

It would be advantageous to have an aircraft seat cushion that was easier to install and offered a longer service life.

SUMMARY

A seat cushion is disclosed in accordance with one or more illustrative embodiments of the present disclosure. In one illustrative embodiment, the seat cushion may include a lower portion, an upper portion, and a forward portion. In another illustrative embodiment, the lower portion may include a lower foam having a first load bearing capacity. In another illustrative embodiment, the upper portion may include an upper foam having a second load bearing capacity. In another illustrative embodiment, the forward portion may include a forward foam having a third load bearing capacity. In another illustrative embodiment, the first load bearing capacity may be higher than the second load bearing capacity and the third load bearing capacity. In another illustrative embodiment, the seat cushion may be configured to be structurally supported by a forward frame element of a seat frame and a seat diaphragm below the seat cushion. In another illustrative embodiment, the lower portion may provide fixed positioning locating of the seat cushion relative to the forward frame element.

In a further aspect, a first Indentation Load Deflection (ILD) rating of the upper foam and a second ILD rating of the forward foam may both be lower than a third ILD rating of the lower foam. In another aspect, the second ILD rating may be higher than the third ILD rating. In another aspect, the lower foam may comprise expanded polypropylene structural foam. In another aspect, the upper foam may comprise polyurethane foam. In another aspect, the forward foam may comprise polyethylene foam. In another aspect, the seat cushion may comprise attachment features to engage a seat diaphragm at a rear edge and prevent the seat cushion from sliding forward. In another aspect, a front portion of the lower portion may define a forward frame attachment element configured to positively engage the forward frame element of the seat frame. In another aspect, the forward frame element may comprise a cylindrical tube, wherein the forward frame attachment element may comprise a curved surface configured to positively engage the forward frame element. In another aspect, the forward frame attachment element may be configured to removably snap over the forward frame element. In another aspect, the lower portion may comprise a flat surface configured to engage the seat diaphragm. In another aspect, the forward portion, as viewed from a cross sectional plane, may be coupled to the upper portion and the lower portion via a common interface, wherein the common interface may be flat.

An aircraft seat is disclosed in accordance with one or more illustrative embodiments of the present disclosure. In one illustrative embodiment, the aircraft seat may include two spreaders, a seat diaphragm, and a seat cushion. In another illustrative embodiment, the seat diaphragm may include a semi-rigid composite frame and a pre-stretched elastomeric fabric bonded to the elastomeric frame. In another illustrative embodiment, the seat cushion may include a lower portion, an upper portion, and a forward portion. In another illustrative embodiment, the lower portion may include a lower foam having a first load bearing capacity. In another illustrative embodiment, the upper portion may include an upper foam having a second load bearing capacity. In another illustrative embodiment, the forward portion may include a forward foam having a third load bearing capacity. In another illustrative embodiment, the first load bearing capacity may be higher than the second load bearing capacity and the third load bearing capacity.

In a further aspect, the seat cushion may be configured to be structurally supported by a forward frame element of a seat frame and the seat diaphragm below the seat cushion. In another illustrative embodiment, the semi-rigid composite frame may define a plurality of spreader attachment elements, each configured to engage a corresponding spreader. In another illustrative embodiment, the lower portion may provide fixed positioning locating of the seat cushion relative to the forward frame element. In another illustrative embodiment, a first Indentation Load Deflection (ILD) rating of the upper foam and a second ILD rating of the forward foam may both be lower than a third ILD rating of the lower foam. In another illustrative embodiment, the second ILD rating may be higher than the third ILD rating. In another illustrative embodiment, the lower foam may comprise expanded polypropylene structural foam. In another illustrative embodiment, the upper foam may comprise polyurethane foam. In another illustrative embodiment, the forward foam may comprise polyethylene foam. In another illustrative embodiment, the seat cushion may comprise attachment features to engage the seat diaphragm at a rear edge and prevent the seat cushion from sliding forward. In another illustrative embodiment, a front portion of the lower portion may define a forward frame attachment element configured to positively engage the forward frame element of the seat frame. In another illustrative embodiment, the forward frame element may comprise a cylindrical tube, wherein the forward frame attachment element may comprise a curved surface configured to positively engage the forward frame element.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," "in embodiments," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

One potential issue with previous aircraft seat cushion is that a bulk of the passenger load is concentrated over the rear/aft beam. By using the front beam both for location and for load bearing, the cushion is positively located and uses existing structure.

Broadly, embodiments of the inventive concepts disclosed herein are directed to a hybrid aircraft seat cushion with dual-use lower foam (e.g., structural foam) configured to be positively located using existing structure (e.g., a forward beam), thereby using the existing structure for both locating and for load bearing. The seat cushion may be hybrid, in a sense, by being partially supported by a soft/flexible diaphragm, and partially supported by a hard (e.g., metallic) beam.

In some embodiments, the seat cushion may be configured to be supported by a diaphragm with a pre-stretched elastomeric fabric. The elastomeric fabric is bonded, via a co-molding process, to a composite frame with features to insert the diaphragm into aircraft seat spreaders. The composite frame defines a rear extension that extends up along the rear of the seat for added support. The rear extension may correspond to a fabric portion that releasably attaches to the seat back of the aircraft seat.

Embodiments of the present disclosure provide added longevity and passenger comfort. The bulk of the occupant load is resolved via the composite frame. The cushion offers a hybrid approach by resting on the diaphragm and the structural forward-most beam of the seat frame.

Figure 10:
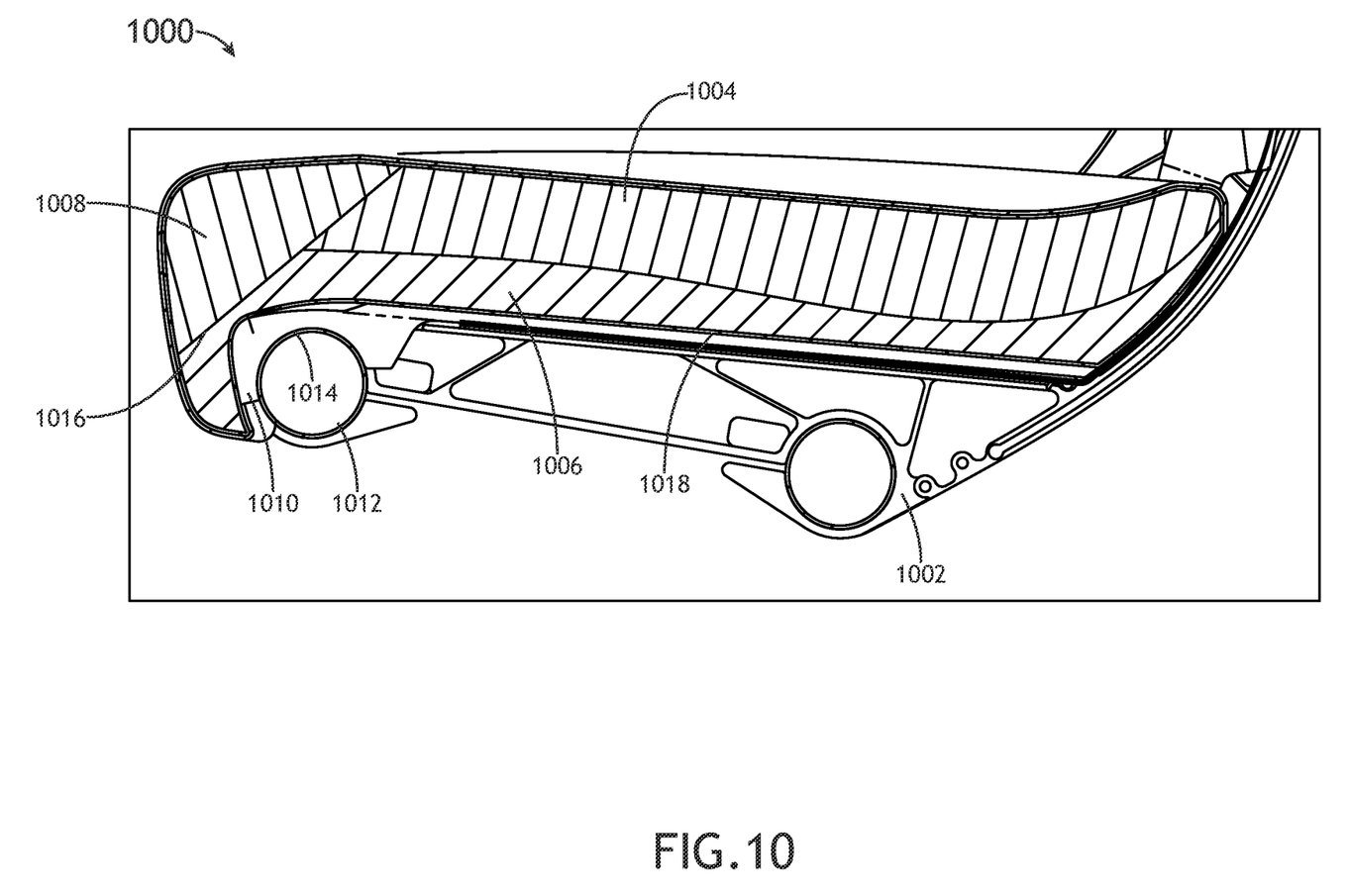
FIG. 10 shows a side, partial view of a seat cushion according to an embodiment.

Referring to FIG. 10, a side, partial view of a seat cushion 1000 according to an exemplary embodiment is shown. An aircraft seat includes two spreaders 1002 configured to support a seat diaphragm (see, e.g., seat diaphragm 100 of FIG. 2). The diaphragm 100 supports a load from the corresponding seat cushion 1000.

In at least one embodiment, the seat cushion 1000 may include attachment features, such as clips, to engage corresponding attachment features (e.g., features 614 of FIG. 6) of the diaphragm 100 at a rear edge and prevent the seat cushion from sliding forward.

In at least one embodiment, the seat cushion 1000 is configured to be structurally supported by a forward frame element 1012 (e.g., tube) of a seat frame and a seat diaphragm 100 below the seat cushion 1000. In at least one embodiment, the lower portion 1006 provides fixed positioning locating (i.e., alignment) of the seat cushion 1000 relative to the forward frame element 1012. For example, the seat cushion 1000 may be configured to snap onto the forward frame element 1012 and rotate down into place.

Furthermore, a front portion of the seat cushion 1000 may define a forward frame attachment element 1010 configured to positively engage the forward frame element 1012 such as a cylindrical tube or beam disposed between the spreaders 1002 at a forward half of the seat. For example, the forward frame attachment element 1010 may include (and/or define) a curved surface 1014 configured to positively engage the forward frame element 1012 (e.g., cylindrical tube). For instance, the curved surface 1014 may be a circular arc greater than 180 degrees (as shown) to allow for some resistance (e.g., foam deformation) in order to removably snap the seat cushion on and off the forward frame element 1012.

The forward frame element 1012 works to absorb some of the passenger load, thereby reducing the load on the diaphragm 100.

The forward frame attachment element 1010 is configured to removably snap over the forward frame element 1012 when the attachment features are engaged to the diaphragm 100. The seat cushion 1000 may be removed for replacement or servicing the diaphragm 100 by lifting the front of the seat cushion to disengage the forward frame attachment element 1010, then sliding the seat cushion 1000 backward to disengage the attachment features.

In at least one embodiment, the seat cushion 1000 comprises a lower portion 1006 of lower foam (e.g., expanded polypropylene structural foam) configured to provide more rigidity and load bearing than other portions of the seat cushion 1000. Furthermore, the lower portion 1006 may define a forward frame attachment element 1010; that is, the forward frame attachment element 1010 may define a shape configured to snap over the forward frame element 1012.

In at least one embodiment, the seat cushion 1000 includes an upper portion 1004 of upper foam (e.g., polyurethane foam) adjacent to the lower portion 1006, and configured for passenger comfort.

Furthermore, the seat cushion 1000 may define a forward portion 1008 of forward foam (e.g., polyethylene and/or polyurethane) adjacent to the lower portion 1006 and the upper portion 1004 that may be a softer formulation than the upper portion 1004 for enhanced passenger comfort.

For example, a first Indentation Load Deflection (ILD) rating of the upper foam 1004 and a second ILD rating of the forward foam 1008 may be both lower than a third ILD rating of the lower foam 1006. The second ILD rating of the forward foam 1008 may be lower than the first ILD rating of the upper foam 1004, for example, to reduce the stress on a portion of the thighs nearest the knees of a passenger for increased comfort.

A first load bearing capacity of the lower foam 1006 may be higher than a second load bearing capacity of the upper foam 1004 and a third load bearing capacity of the forward foam 1008. In this regard, the lower foam 1006 (e.g., structural foam) may provide more resistance to large loads while also providing for enough load bearing capacity to function as an alignment tool by providing coupling under load when coupled to the forward frame element 1012.

In at least one embodiment, the forward portion 1008, as viewed from a cross sectional plane, is coupled to the upper portion 1004 and the lower portion 1006 via a common interface 1016. For example, the common interface 1016 may be flat. For instance, the common interface 1016 may be flat and configured such that a forward portion 1008 cut with a straight tool (e.g., hot wire, band saw) may be more easily aligned with the multiple pieces of other foam 1006, 1004. In one method of manufacture, the lower foam 1006 and upper foam 1004 are coupled (e.g., glued with adhesive) and cut with a straight tool in preparation for being combined (e.g., with adhesive) with the forward foam 1008 at the common interface 1016. In this way, three straight cuts allow for three foams to be combined at a single, continuously flat common interface 1016. This may allow for a relatively simple, efficient, and reliably assembled seat cushion.

In at least one embodiment, the lower portion 1006 includes a flat surface 1018 configured to engage (e.g., rest upon and be structurally supported by) the seat diaphragm 100. As shown, the flat surface 1018 may extend across the width of the seat cushion and be angled upwards (e.g., more than 1 degree above horizontal such that a forward edge of the flat surface is higher than a rear edge).

In embodiments, the seat cushion 100 may include an outer covering (e.g., upholstery fabric wrapped around the foam portions 1004, 1006, 1008).

Various details and embodiments are described below, such as detail on various embodiments of a seat diaphragm 100 that includes a pre-stretched elastomeric fabric 102 bonded to a composite frame. Note that U.S. patent application Ser. No. 17/697,262, filed on Mar. 17, 2022 and entitled COMPOSITE SEAT BOTTOM DIAPHRAGM discloses a seat diaphragm 100 that includes a pre-stretched elastomeric fabric 102 bonded to a composite frame.

Figure 1:
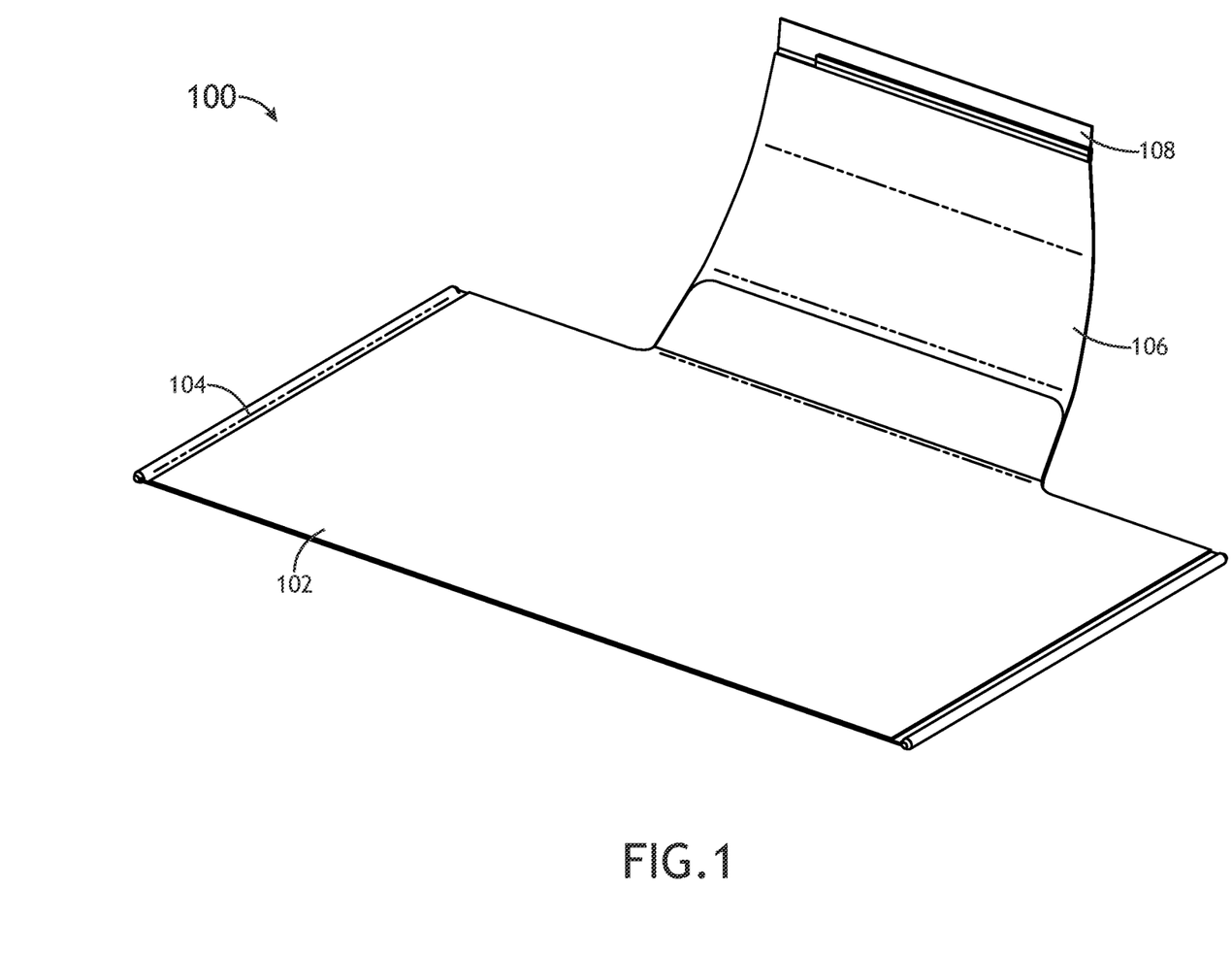
FIG. 1 shows a perspective view of a seat diaphragm according to an embodiment.

Referring to FIG. 1, a perspective view of a seat diaphragm 100 according to an embodiment is shown. The seat diaphragm 100 includes a pre-stretched elastomeric fabric 102 bonded to a composite frame (obscured) that maintains tension in the pre-stretched elastomeric fabric 102. The composite frame defines attachment elements 104 that secure the composite frame (and thereby the pre-stretched elastomeric fabric 102) to seat spreaders. In at least one embodiment, the elastomeric fabric 102 is comprised of Dymetrol; alternatively, or in addition, the elastomeric material 102 may be comprised of CrystalFlex lite. Other pre-stretchable/pre-tensionable materials may be used provided they are suitable for aircraft seat diaphragms and bonding to a composite frame.

In at least one embodiment, the seat diaphragm 100 includes a rear fabric extension 106. The rear fabric extension 106 may be an extension of the pre-stretched elastomeric fabric 102 or a separate fabric element, also bonded to the composite frame. Likewise, the rear fabric extension 106 may not be pre-stretched (tensioned). In at least one embodiment, the rear fabric extension 106 includes a seat back attachment element 108 to releasably attach the rear fabric extension 106 to an aircraft seat back. In at least one embodiment, the seat back attachment element 108 may comprise a zipper oriented to engage a corresponding zipper attached to the aircraft seat back.

Figure 2:
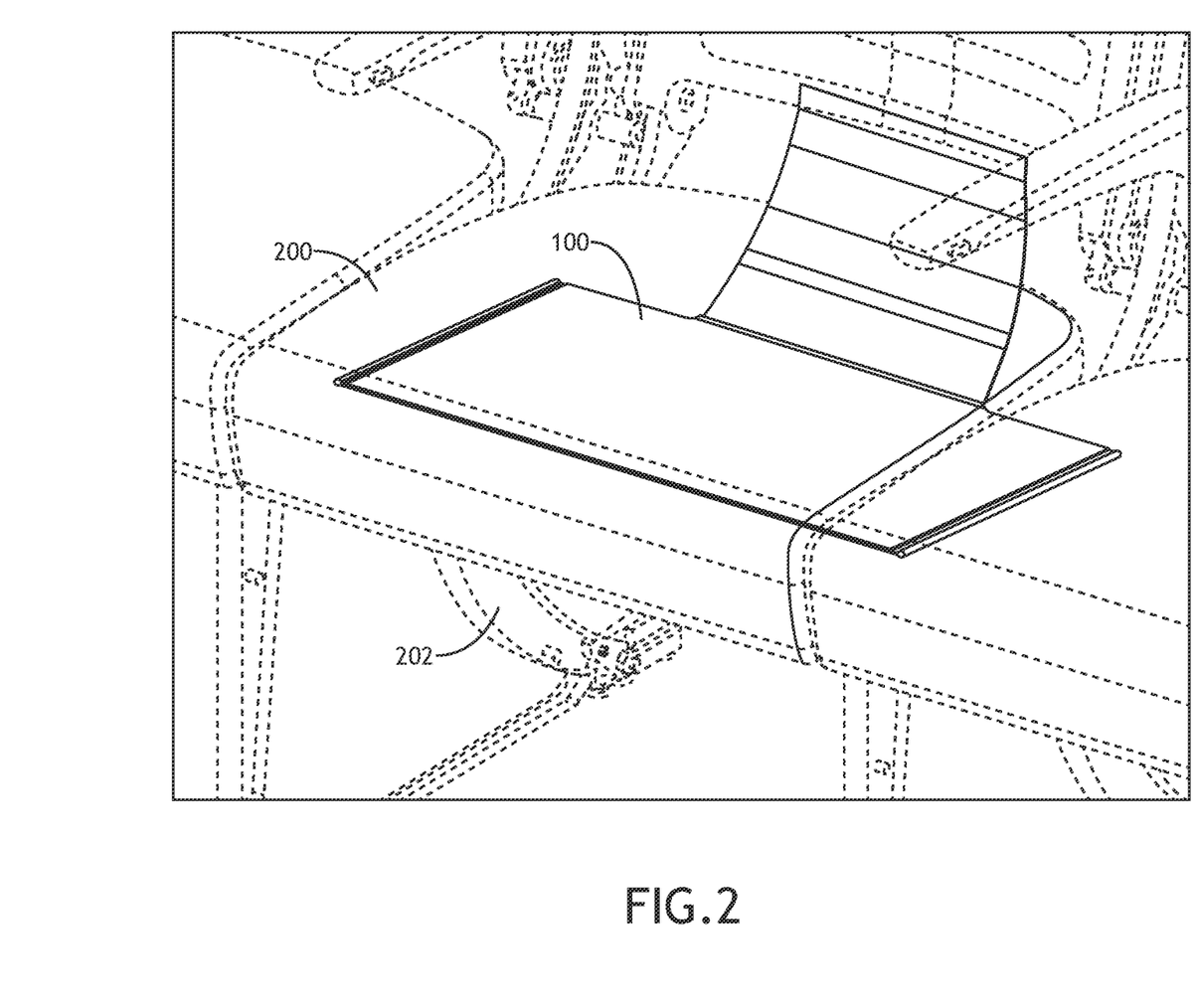
FIG. 2 shows a perspective, environmental view of a seat diaphragm according to an embodiment.

Referring to FIG. 2, a perspective, environmental view of a seat diaphragm 100 according to an embodiment is shown. The seat diaphragm 100 engages seat spreaders 202 to support a seat cushion 200 (and passenger). The composite frame, in addition to maintaining tension in the pre-stretched elastomeric fabric, also supports some of the load of the seat cushion 200 and passenger at the periphery, reducing the load on the pre-stretched elastomeric fabric and thereby improving the service life of the seat diaphragm 100.

Figure 3:
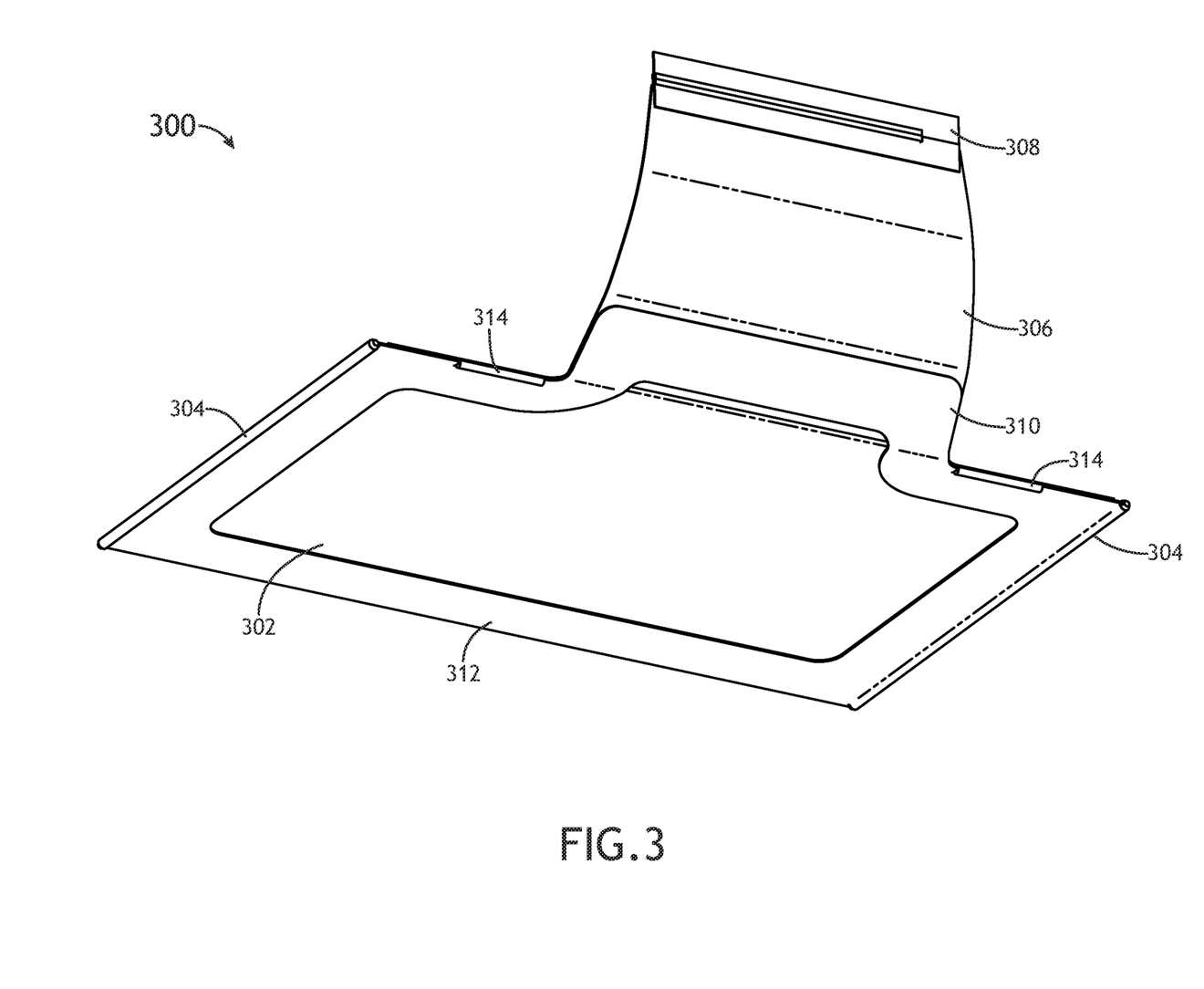
FIG. 3 shows a perspective view of a seat diaphragm according to an embodiment.

Referring to FIG. 3, a perspective view of a seat diaphragm 300 according to an embodiment is shown. The seat diaphragm 300 includes a pre-stretched elastomeric fabric 302 bonded to a composite frame 312. The composite frame defines attachment elements 304 that secure the composite frame to seat spreaders. The seat diaphragm 300 may include a non-tensioned rear fabric extension 306 bonded to the composite frame 312. The composite frame 312 is configured to be rigid or semi-rigid in at least one dimension such that the attachment elements 304 maintain their shape sufficiently for easy insertion into a corresponding spreader.

In at least one embodiment, the rear fabric extension 306 includes a seat back attachment element 308 (such as a zipper or components of a zipper) to releasably attach the rear fabric extension 306 to an aircraft seat back. In at least one embodiment, the non-tensioned rear fabric extension 306 is bonded to a rear extension 310 of the composite frame 312. The rear extension 310 may comprise a portion of the composite frame 312 translated backward (with respect to a corresponding aircraft seat), and capable of conforming to the curvature of the rear fabric extension 306 when connected to a seat back. The shape of the composite frame 312 including the rear extension 310 produces a pressure map that is more desirable than a strictly rectangular composite frame 312. It may be appreciated that a continuous curved transition between the rear portion of the composite frame 312 and the rear extension 310 is desirable for comfort and for the service life of the seat diaphragm 300.

In at least one embodiment, the composite frame 312 may include seat cushion attachment elements 314. The seat cushion attachment elements 314 are disposed to engage corresponding attachment clips disposed on a bottom rear surface of a corresponding seat cushion.

Figure 4:
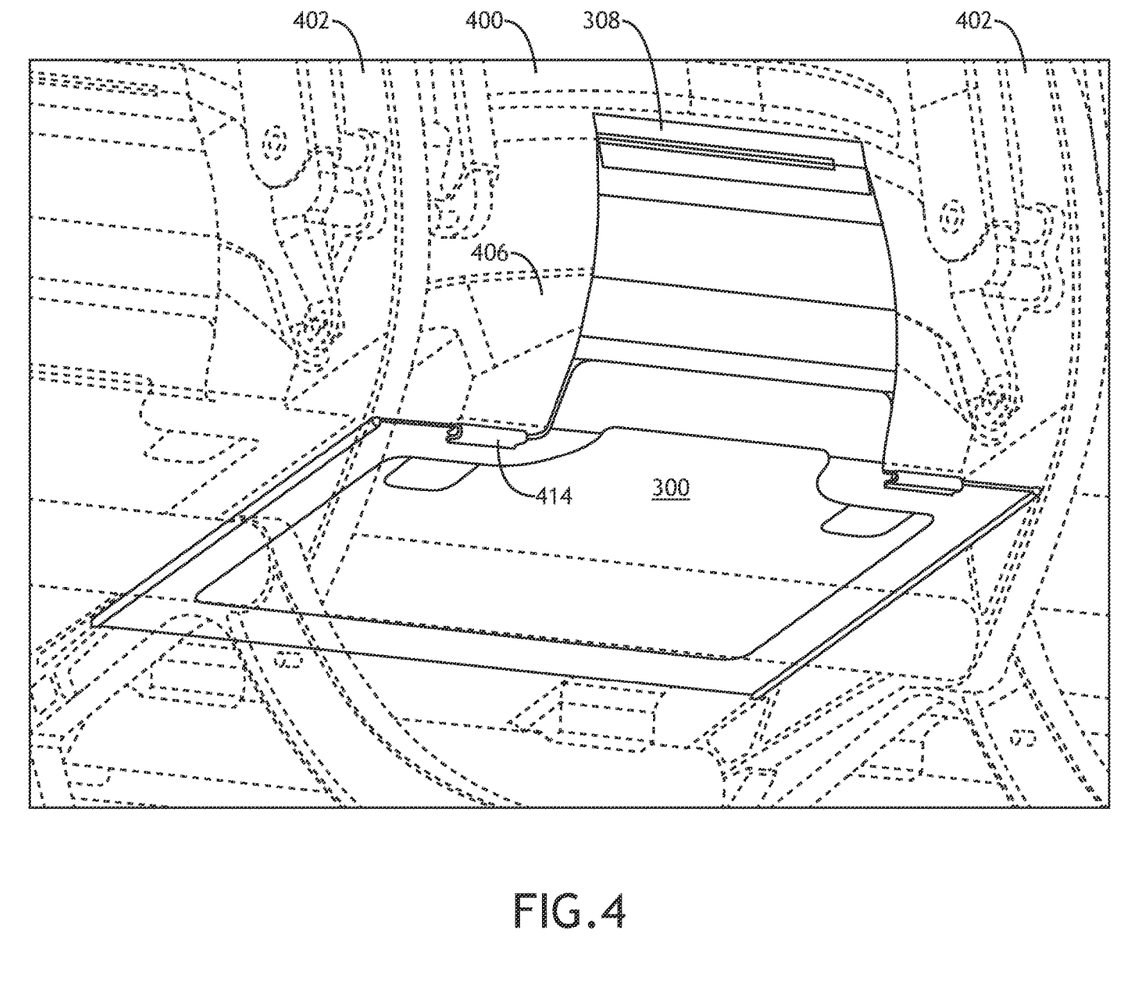
FIG. 4 shows a perspective, environmental view of a seat diaphragm according to an embodiment.

Referring to FIG. 4, a perspective, environmental view of a seat diaphragm 300 according to an embodiment is shown. The seat diaphragm 300 engages seat spreaders 402 to support a seat cushion 406. The seat cushion 406 is maintained in position via one or more attachment clips 414 disposed on the seat cushion 406.

In at least one embodiment, a rear fabric extension is releasably attached to a corresponding seat back 400 via a seat back attachment element 308. The seat back attachment element 308 provides a further support structure to seat diaphragm 300.

Figure 5:
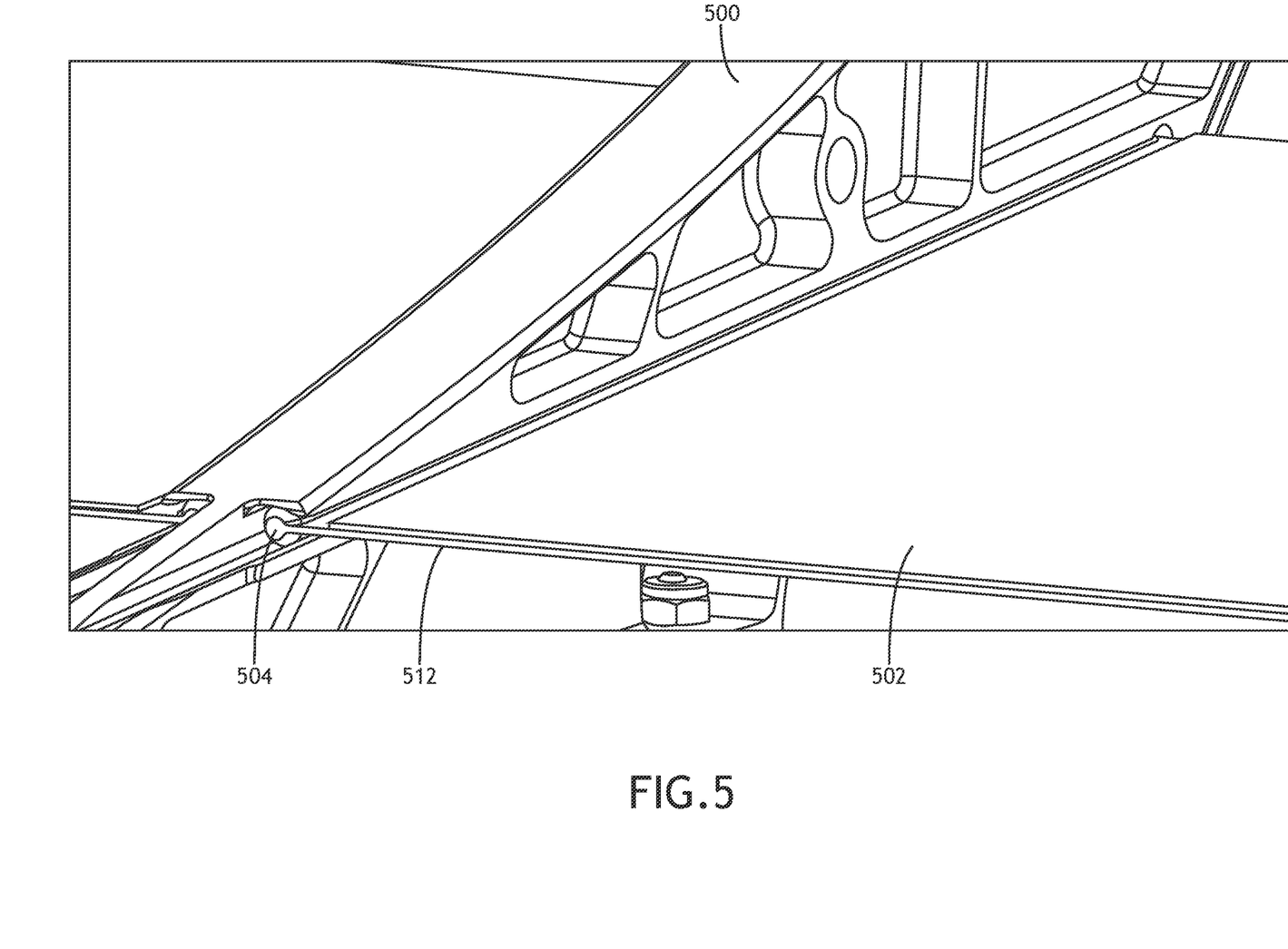
FIG. 5 shows a perspective, detail view of a seat diaphragm according to an embodiment.

Referring to FIG. 5, a perspective, detail view of a seat diaphragm according to an embodiment is shown. In at least one embodiment, the seat diaphragm includes a pre-stretched elastomeric fabric 502 bonded to a composite frame 512. The composite frame 512 defines spreader attachment elements 504 configured to engage corresponding spreaders 500 to define a seat cushion surface. In at least one embodiment, the spreader attachment elements 504 may comprise a rail or keder configured to engage a channel defined by the corresponding spreader. Because the elastomeric fabric 502 is pre-stretched, and tension is maintained by the composite frame 512, the seat diaphragm may be installed in the spreaders 500 without the need to simultaneously stretch the seat fabric, making installation easier than existing seat diaphragms.

Figure 6:
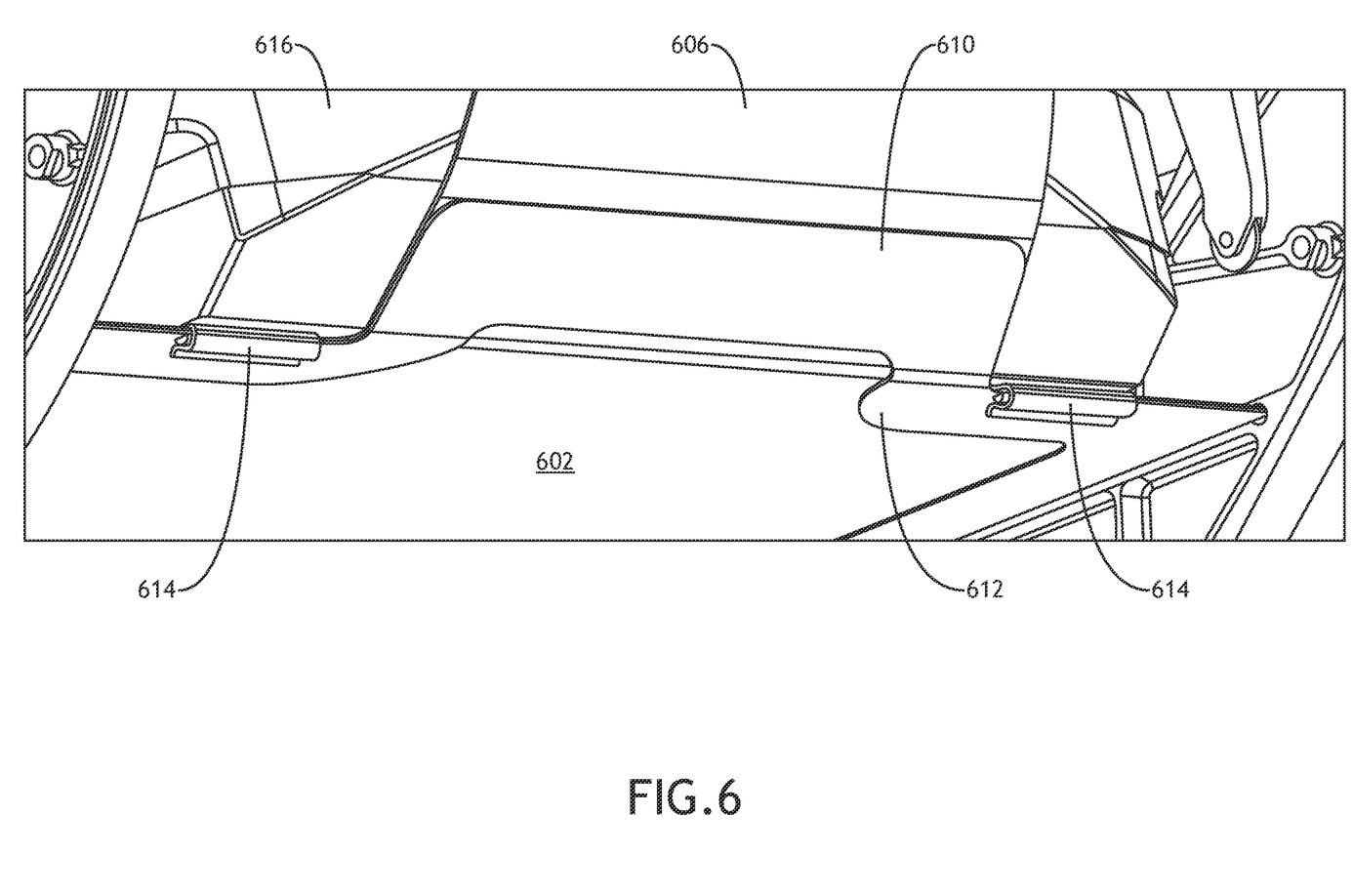
FIG. 6 shows a perspective, detail view of a seat diaphragm according to an embodiment.

Referring to FIG. 6, a perspective, detail view of a seat diaphragm according to an embodiment is shown. The seat diaphragm 600 includes a pre-stretched elastomeric fabric 602 bonded to a composite frame 612 configured to be installed between two seat spreaders. The seat diaphragm 600 may include a non-tensioned rear fabric extension 606 bonded to a rear extension 610 of the composite frame 612.

In at least one embodiment, the composite frame 612 may include seat cushion attachment elements disposed to engage corresponding attachment clips 614 disposed on a bottom rear surface of a corresponding seat cushion 616.

Figure 7:
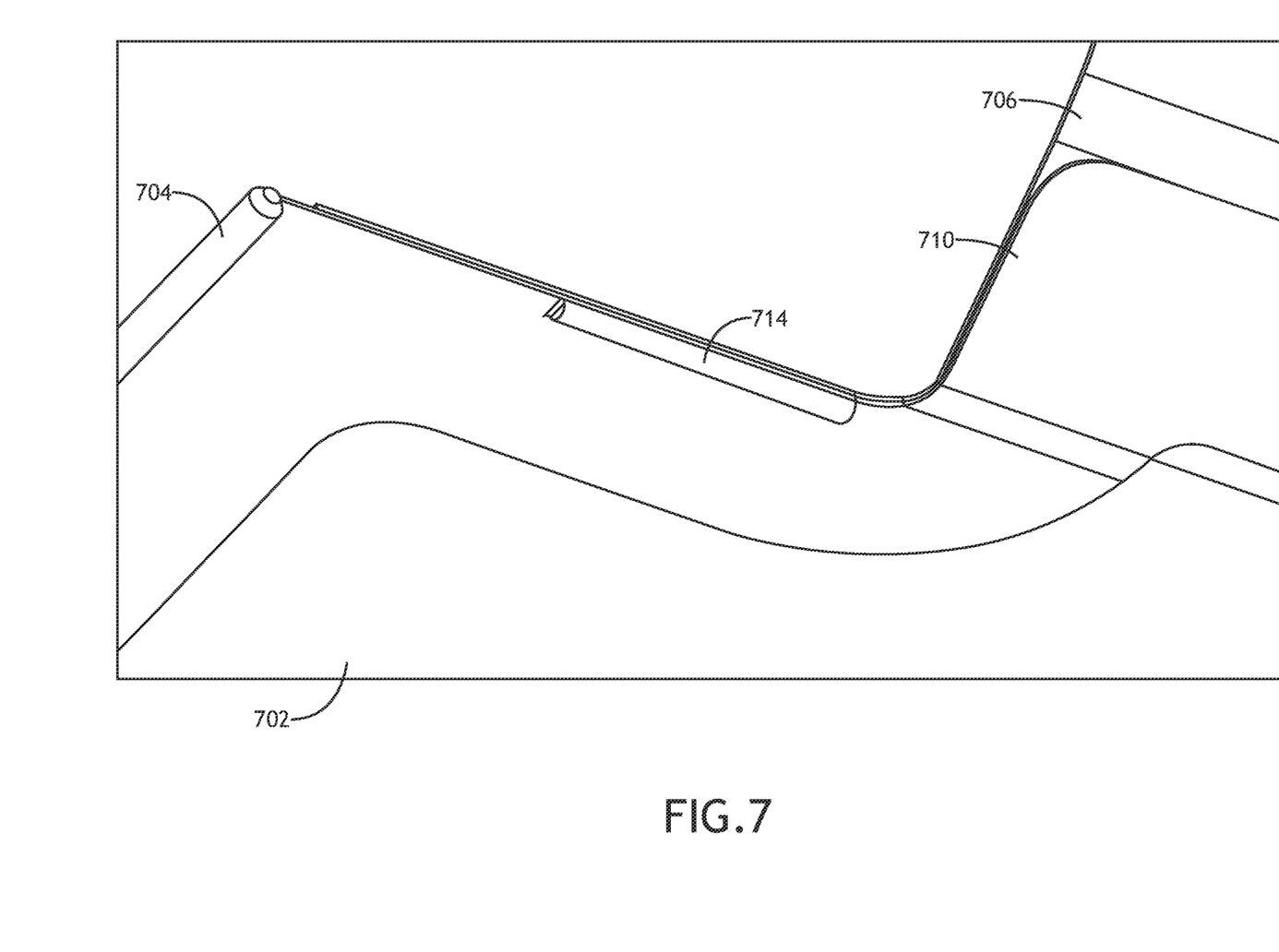
FIG. 7 shows a perspective, detail view of a seat diaphragm according to an embodiment.

Referring to FIG. 7, a perspective, detail view of a seat diaphragm according to an embodiment is shown. The seat diaphragm 700, including a pre-stretched elastomeric fabric 702 bonded to a composite frame 712 and a non-tensioned rear fabric extension 706 bonded to a rear extension 710 of the composite frame 712, includes seat cushion attachments elements 714. The seat cushion attachment elements 714 may comprise extruded or distended portions integrated into the composite frame 712. In at least one embodiment, the seat cushion attachments elements 714 may operate in concert with a corresponding front frame structure, tube, or beam of the aircraft seat to limit or prevent both forward and backward movement of the seat cushion. As described more fully herein.

Figure 8:
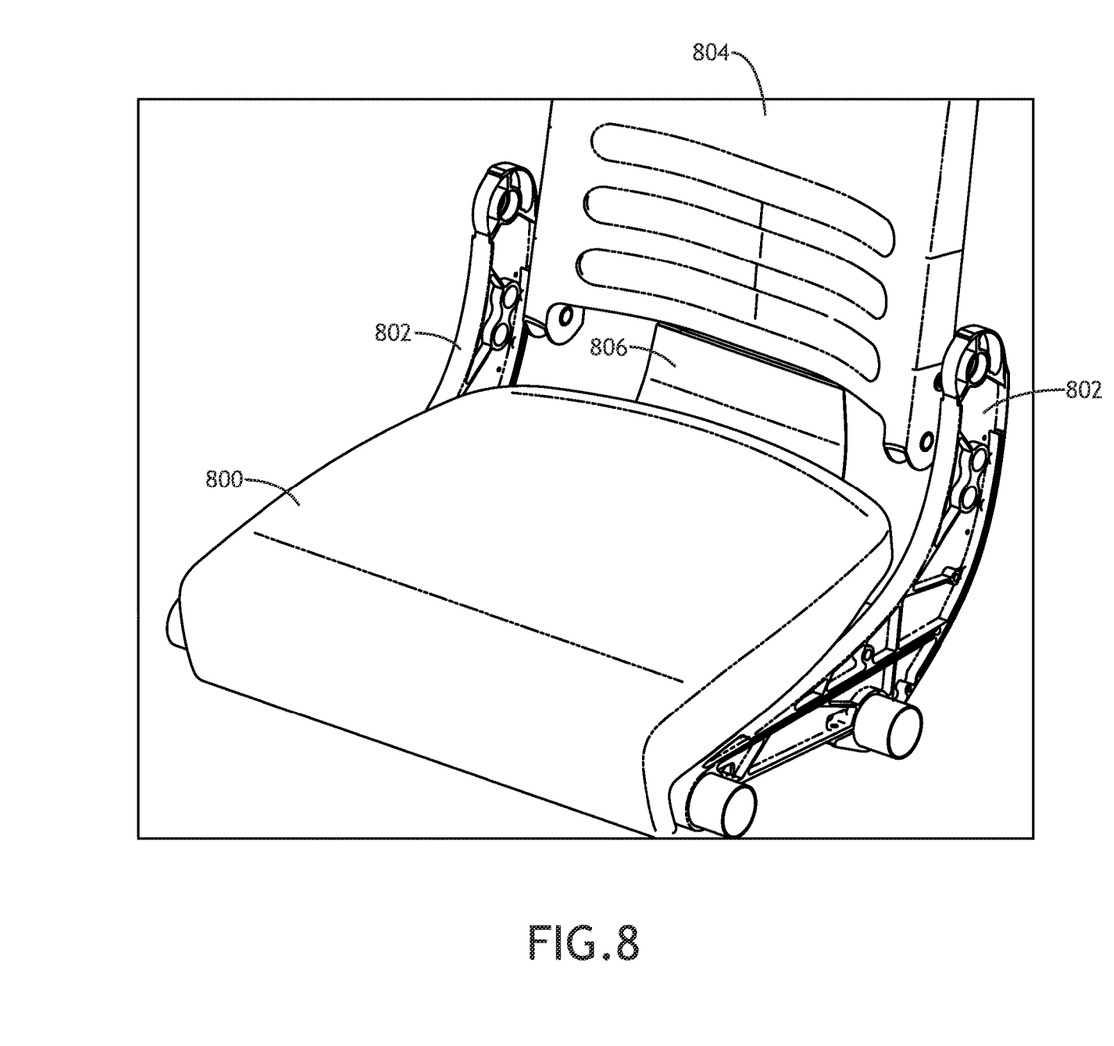
FIG. 8 shows a perspective, environmental view of a seat diaphragm according to an embodiment.
Figure 9:
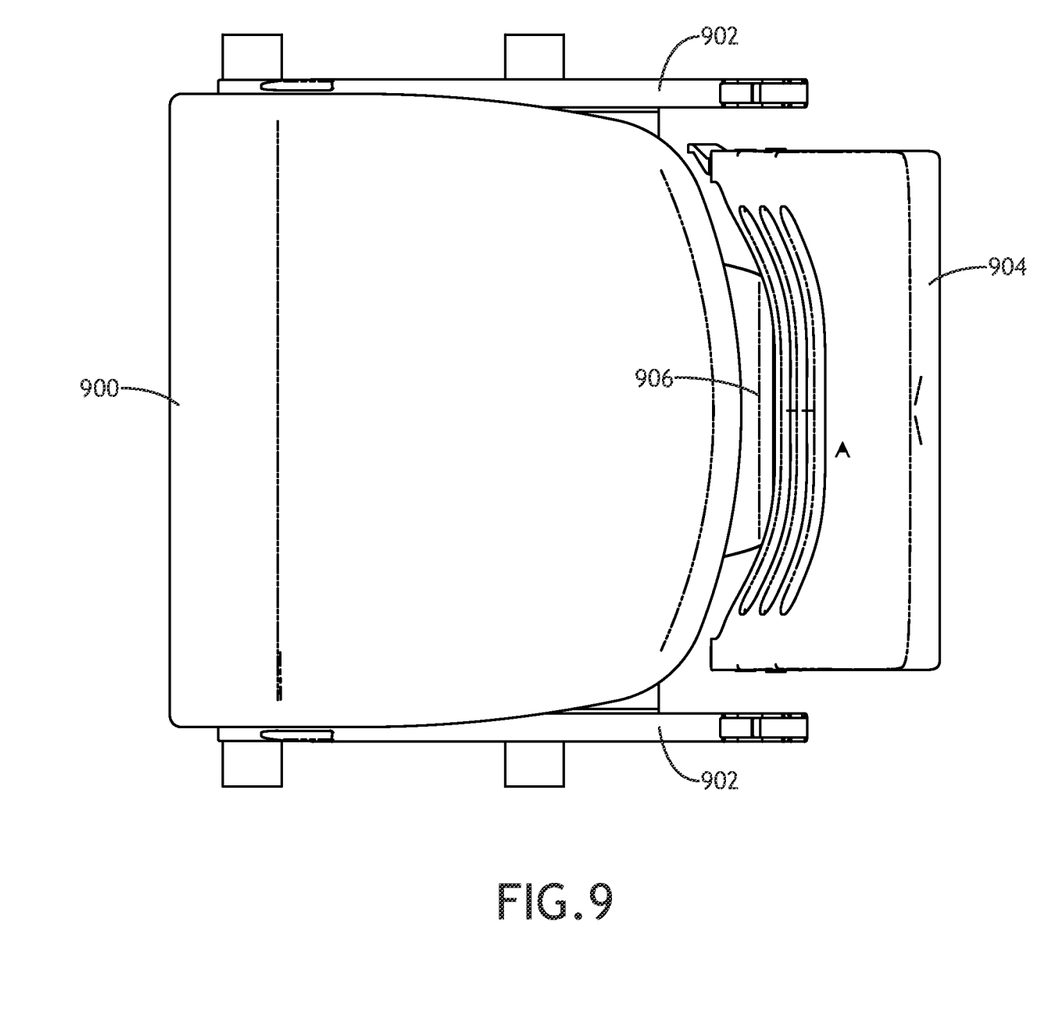
FIG. 9 shows a top, environmental view of a seat diaphragm according to an embodiment.

Referring to FIGS. 8 and 9, a perspective and top, environmental view of a seat diaphragm according to an embodiment are shown. The seat comprises spreaders 802, 902 that support a seat back 804, 904 and a seat diaphragm (obscured) with a rear fabric portion 806, 906 releasably connecting the seat diaphragm to the seat back 804, 904. A seat cushion 800, 900 is disposed on the seat diaphragm, and in at least one embodiment, held in place via seat cushion attachment elements and clips disposed to engage on the seat diaphragm, and a front seat frame engaging section of the seat cushion 800, 900.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A seat cushion comprising:
   a lower portion comprising a lower foam having a first load bearing capacity;
   an upper portion adjacent to the lower portion and comprising an upper foam having a second load bearing capacity;
   a forward portion adjacent to the lower portion and the upper portion and comprising a forward foam having a third load bearing capacity;
   wherein the first load bearing capacity is higher than the second load bearing capacity and the third load bearing capacity,
   wherein the seat cushion is configured to be structurally supported by a forward frame element of a seat frame and a seat diaphragm below the seat cushion,
   wherein a front portion of the lower portion may define a forward frame attachment element configured to positively engage the forward frame element of the seat frame,
   wherein the lower portion provides fixed positioning locating of the seat cushion relative to the forward frame element via the forward frame attachment element,
   wherein the forward frame attachment element is configured to removably snap, via foam deformation, on the forward frame element, to thereby provide the fixed positioning locating.

2. The seat cushion of claim 1,
wherein a first Indentation Load Deflection (ILD) rating of the upper foam and a second ILD rating of the forward foam are both lower than a third ILD rating of the lower foam.

3. The seat cushion of claim 2,
wherein the second ILD rating is higher than the third ILD rating.

4. The seat cushion of claim 1,
wherein the lower foam comprises expanded polypropylene structural foam.

5. The seat cushion of claim 1,
wherein the upper foam comprises polyurethane foam.

6. The seat cushion of claim 1,
wherein the forward foam comprises polyethylene foam.

7. The seat cushion of claim 1,
wherein the seat cushion comprises attachment features to engage the seat diaphragm at a rear edge and prevent the seat cushion from sliding forward.

8. The seat cushion of claim 1,
wherein the forward frame element comprises a cylindrical tube, wherein the forward frame attachment element comprises a curved surface configured to positively engage the forward frame element.

9. The seat cushion of claim 1,
wherein the lower portion comprises a flat surface configured to engage the seat diaphragm.

10. The seat cushion of claim 1,
wherein the forward portion, as viewed from a cross sectional plane, is coupled to the upper portion and the lower portion via a common interface, wherein the common interface is flat.

11. An aircraft seat comprising:
two spreaders;
a seat diaphragm comprising:
  a semi-rigid composite frame; and
  a pre-stretched elastomeric fabric bonded to the semi-rigid composite frame; and
a seat cushion comprising:
  a lower portion comprising a lower foam having a first load bearing capacity;
  an upper portion adjacent to the lower portion and comprising an upper foam having a second load bearing capacity; and
  a forward portion adjacent to the lower portion and the upper portion and comprising a forward foam having a third load bearing capacity;

wherein the first load bearing capacity is higher than the second load bearing capacity and the third load bearing capacity,
wherein the seat cushion is configured to be structurally supported by a forward frame element of a seat frame and the seat diaphragm below the seat cushion,
wherein the semi-rigid composite frame defines a plurality of spreader attachment elements, each configured to engage a corresponding spreader,
wherein a front portion of the lower portion may define a forward frame attachment element configured to positively engage the forward frame element of the seat frame,
wherein the lower portion provides fixed positioning locating of the seat cushion relative to the forward frame element via the forward frame attachment element,
wherein the forward frame attachment element is configured to removably snap, via foam deformation, on the forward frame element, to thereby provide the fixed positioning locating.

12. The aircraft seat of claim 11,
wherein a first Indentation Load Deflection (ILD) rating of the upper foam and a second ILD rating of the forward foam are both lower than a third ILD rating of the lower foam.

13. The aircraft seat of claim 12,
wherein the second ILD rating is higher than the third ILD rating.

14. The aircraft seat of claim 11,
wherein the lower foam comprises expanded polypropylene structural foam.

15. The aircraft seat of claim 11,
wherein the upper foam comprises polyurethane foam.

16. The aircraft seat of claim 11,
wherein the forward foam comprises polyethylene foam.

17. The aircraft seat of claim 11,
wherein the seat cushion comprises attachment features to engage the seat diaphragm at a rear edge and prevent the seat cushion from sliding forward.

18. The aircraft seat of claim 11,
wherein the forward frame element comprises a cylindrical tube, wherein the forward frame attachment element comprises a curved surface configured to positively engage the forward frame element.

* * * * *